United States Patent

Kashiwagi

[11] Patent Number: 6,078,560
[45] Date of Patent: Jun. 20, 2000

[54] OPTICAL RECORDING MEDIUM AND OPTICAL RECORDING/REPRODUCING APPARATUS

[75] Inventor: Toshiyuki Kashiwagi, Tokyo, Japan

[73] Assignee: Sony Corporation, Tokyo, Japan

[21] Appl. No.: 09/416,398

[22] Filed: Oct. 12, 1999

[30] Foreign Application Priority Data

Oct. 14, 1998 [JP] Japan .................................. 10-292281

[51] Int. Cl.[7] ...................................................... G11B 7/24
[52] U.S. Cl. ........................................ 369/275.5; 369/283
[58] Field of Search ............................. 369/275.5, 275.1, 369/283, 272, 274, 288; 428/64.4, 64.6, 64.9; 430/320, 321

[56] References Cited

U.S. PATENT DOCUMENTS

| | | | |
|---|---|---|---|
| 4,449,138 | 5/1984 | Ando | 346/135.1 |
| 5,276,674 | 1/1994 | Tanaka | 369/275.5 |
| 5,392,263 | 2/1995 | Watanabe et al. | 369/13 |
| 5,587,990 | 12/1996 | Watanabe et al. | 369/275.2 |
| 5,838,646 | 11/1998 | Watanabe et al. | 369/13 |
| 5,838,656 | 11/1998 | Watanabe et al. | 369/275.2 |
| 6,023,451 | 2/2000 | Kashiwagi et al. | 369/275.5 |

*Primary Examiner*—Tan Dinh
*Attorney, Agent, or Firm*—Frommer Lawrence & Haug, LLP.; William S. Frommer

[57] ABSTRACT

A high-density optical recording medium and an optical recording/reproducing apparatus uses short wavelength blue laser beams to perform recording and reproducing. A 0.6-mm thick light-transmitting layer is formed on an information-recording face of the recording medium. A laser beam having a wavelength $\lambda$ of 390 nm$\leq\lambda\leq$440 nm is transmitted via a lens system having an NA of $0.6\leq NA\leq0.72$, through the light-transmitting layer. The optical recording medium allows recording and/or reproducing to be performed by use of the laser beam. Variation in the thickness of the light-transmitting layer is within a range of $\pm5.98\ \lambda/(NA)^4$.

13 Claims, 6 Drawing Sheets

OPTICAL RECORDING MEDIUM AND OPTICAL RECORDING/REPRODUCING APPARATUS

BACKGROUND OF THE INVENTION

The present invention relates to optical recording media, such as optical discs and optical cards. The invention also relates to an optical recording/reproducing apparatus for performing optical recording and/or reproducing.

Because of recent rapid progress in the development in the field of information-processing technology, data is increasingly represented as digital signals. This is particularly the case in the fields of information processing, telecommunications, video display, and audio. There is therefore an increasing demand for high-density optical discs for recording information and distributing software. One of the most effective and reliable means being developed for providing such high-density optical discs involves the use of short wavelength blue laser beams for high numerical aperture (NA) optical systems to record and reproduce optical signals.

One example of such a high-density optical disc, is the digital versatile disc (DVD), which is becoming more standardized and used in practical applications. Technical developments for increasing the storage capacity of DVDs and media related to DVDs are reported in many publications, for example, "Nikkei Electronics", Vol. No. 688, May 5, 1997 (Table 1 on page 13).

OBJECTS OF THE INVENTION

It is an object of the invention to provide a high-density optical recording medium and a high-density optical recording/reproducing apparatus that uses a short wavelength blue laser beam for optical recording and reproducing, while maintaining compatibility with a conventional DVD.

It is another object of the invention to provide a high density optical recording medium and a high-density optical recording/reproducing apparatus that employs a high numerical aperture lens and a blue laser beam for optical recording and reproducing, while maintaining compatibility with conventional DVDs.

Still other objects and advantages of the invention will in part be obvious and will in part be apparent from the specification and the drawings.

SUMMARY OF THE INVENTION

In accordance with the invention, an optical recording medium having a light-transmitting layer with a thickness of approximately 0.6 mm is provided. The optical recording medium allows at least one of recording and reproducing to be performed with a laser beam having a wavelength of 390 nm$\leq \lambda \leq$440 nm which is incident on the light-transmitting layer of the optical recording medium. The laser beam is focused on the optical recording medium via a lens system having a numerical aperture (NA) of 0.6$\leq$NA$\leq$0.72. Variation in the thickness of the light-transmitting layer is maintained within $\pm 5.98$ $\lambda/(NA)^4$ from its average thickness value.

According to another aspect of the invention, an optical recording/reproducing apparatus is provided that includes an optical recording medium having a light-transmitting layer with a thickness of 0.6 mm and with variation of this thickness maintained within a range of $\pm 5.98$ $\lambda/(NA)^4$. The optical recording/reproducing apparatus performs at least one of recording and reproducing utilizing a laser beam having a wavelength of 390 nm$\leq \lambda \leq$440 nm, The laser beam is incident to the optical recording medium through the light-transmitting layer via an objective lens having a numerical aperture (NA) of 0.6$\leq$NA$\leq$0.72.

In accordance with the invention, high density and high capacity recording or reproducing may be performed while compatibility with conventional DVDs is maintained. Thus, while compatibility with conventional DVDs and conventional recording/reproducing apparatuses is maintained, a high increased recording density can be achieved.

Furthermore, in accordance with the recording/reproducing apparatus of the invention the slant angle of the optical unit that performs recording and/or reproducing can be adjusted according to a skew of the optical recording medium. Thereby, any skew of the optical recording medium can be substantially compensated for, and high-density recording and reproducing can be performed.

The invention accordingly comprises the several steps and the relation of one or more of such steps with respect to each of the others, and the apparatus embodying features of construction, combinations of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Referring first to FIGS. 1 to 5 cross-sectional views of a plurality of optical recording medium according to the invention are shown. As shown in these drawings, an optical recording medium is formed with a light-transmitting layer "$t_1\sim t_5$" formed on an information-recording face. The light-transmitting layer has a thickness of 0.6 mm with a variation range $\Delta t$ of $\pm 5.98\ \lambda/(NA)^4$. Reproducing and recording is performed to or from the recording medium with a laser beam having a wavelength $\lambda$ of 390 nm$\leq\lambda\leq$440 nm transmitted through the light-transmitting layer of the optical recording medium including via a lens system having a numerical aperture (NA) of $0.6\leq NA\leq 0.72$.

In FIGS. 1–5, "tc" represents a thickness of a clamp section of the recording medium. The clamp section is constructed so as to be removably fitted to a drive unit of an optical recording/reproducing apparatus compatible with an ordinary DVD. The thickness tc is presently standardized at 1.2 mm so as to be compatible with a conventional DVD. While FIGS. 1–5 show various examples of an optical recording media constructed in accordance with the present invention, the optical recording medium is not restricted to these examples.

Figure 1:
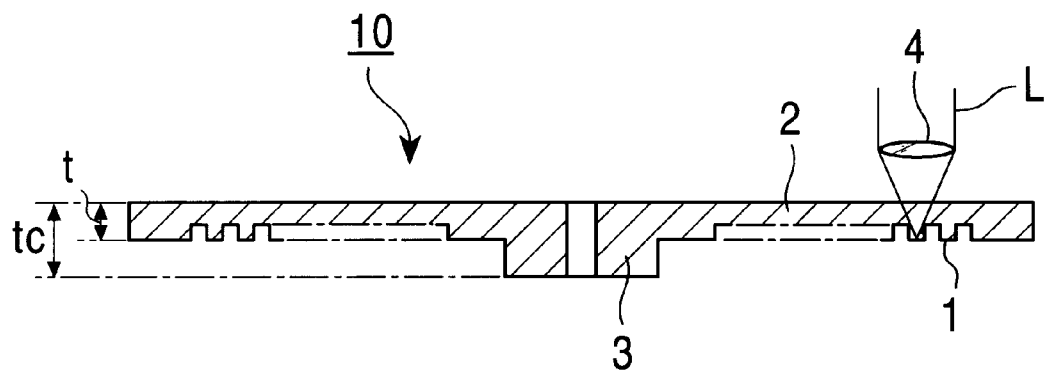
FIG. 1 is a cross-sectional view of an optical recording medium constructed in accordance with a first embodiment of the invention.

As is shown in FIG. 1, an optical recording medium 10 is formed of a light-transmissive disc substrate formed by injection molding of, for example, a polycarbonate (PC). Also, at least a section of optical recording medium 10 forming a clamp section 3 for removably fitting the recording medium to the disc-rotating drive unit of the optical recording/reproducing apparatus is formed with a thickness tc of 1.2 mm (as noted above). A light-transmitting layer 2 is defined by a peripheral portion of the recording medium adjacent to clamp section 3, and includes a section forming an information-recording face 1. Light transmitting layer 2 is formed with a thickness of $t_1$=0.6 mm $\pm 5.98\ \lambda/(NA)^4$, where $\lambda$ is in micrometers. Optical recording and/or reproduction at information recording face 1 of optical recording medium 10 is performed by focusing laser beam L incident on the recording medium through the light-transmitting layer via an objective lens 4.

Information-recording face 1 may be formed as an information-recording face of a ROM (read-only memory) including information recording pits formed into recording tracks. In this case, the surface of information recording face 1 is formed of an aluminum deposition film and the recordable region may extend over part or all of light-transmitting layer 2. Information-recording face 1 is formed such that guide grooves form recording tracks on light-transmitting layer 2. The recordable region is formed within each guide groove and/or between adjacent guide grooves. Magneto-optical recording layers are coated on the face of the light transmitting layer on which the aforementioned grooves and pits are formed so as to allow information to be read using the Kerr effect. Alternatively, a recording laser can be used that emits light to cause phase transition and pit formation of the light transmitting layer. Such a write procedure causes variations in the optical characteristics of the light transmitting layer and interference patterns are generated. The information is read in accordance with these changes in the characteristics of the light transmitting layer 2 formed therein. Reflecting layers are formed on the recording layers of the recording medium as required. In addition, protective layers are adhered on the surfaces of light-transmitting layer 2 for protection. The apparatus as set forth in FIG. 2 uses similar elements to those depicted in FIG. 1, but are arranged slightly differently.

In the example shown in FIG. 1, information-recording face 1 is formed at an indented part of the recording medium stepped back from a main face of clamp section 3. In the example shown in FIG. 2, an information-recording face 21 of a recording medium 20 includes a light-transmitting layer 22 having a thickness $t_2$=0.6 mm $\pm 5.98\ \lambda/(NA)^4$, where $\lambda$ is in micrometers and is formed with grooves coplanar with the face of a clamp section 23. Optical recording and/or reproducing at information-recording face 21 of optical recording medium 20 is performed by focussing laser beam L incident on the recording medium through the light-transmitting layer via an objective lens 24.

Figure 3:
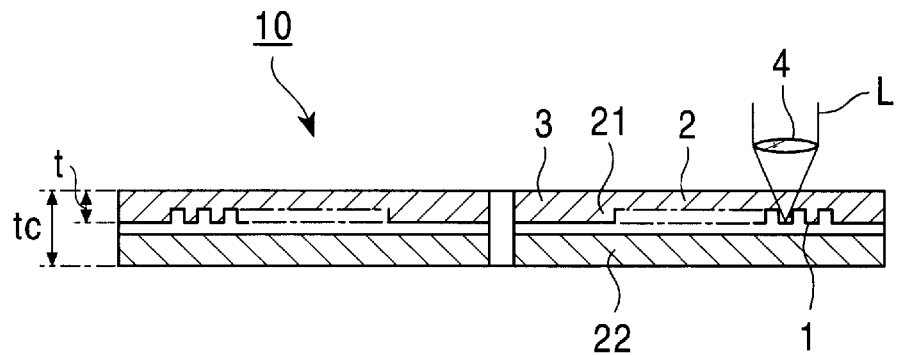
FIG. 3 is a cross-sectional view of an optical recording medium constructed in accordance with a third embodiment of the invention.
Figure 4:
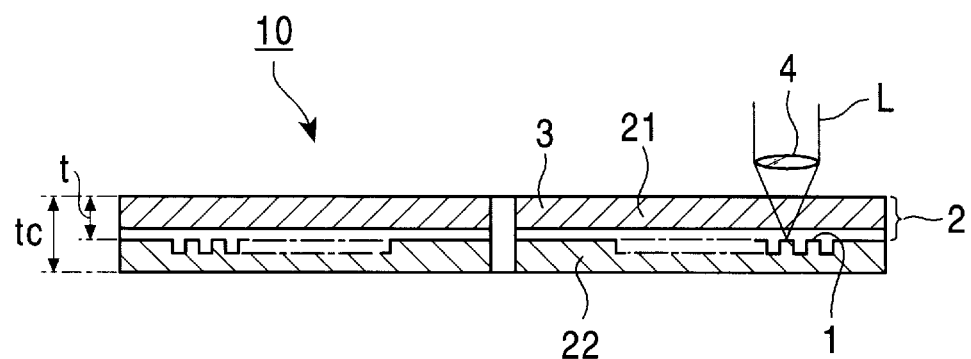
FIG. 4 is a cross-sectional view of an optical recording medium constructed in accordance with a fourth embodiment of the invention.

As is shown in FIGS. 3 and 4, recording media 30 or 40 constructed in accordance with third and fourth embodiments of the invention are respectively formed with a first substrate 31 or 41 and a second substrate 32 or 42. These first and second substrates are coupled via an ultra-violet-curing resin so that the recording media (including a clamp portion 37 or 47 thereof) have an overall thickness tc of 1.2 mm. It is advantageous that first substrates 31 or 41 and second substrates 32 or 42 are formed of the same material, such as polycarbonite, and have the same thickness in order to prevent deformation of the recording media. However, the second substrate 32 or 42 may be formed of a nontransparent material.

In the example shown in FIG. 3, an information recording face 33 is formed on a surface of first substrate 31 opposing second substrate 32. In the example shown in FIG. 4, an information-recording face 43 is formed on a surface of second substrate 42 opposing first substrate 41. In either case, first substrate 31 or 41 forms a light-transmitting layer 36 or 46, respectively. The information-recording face in FIGS. 3 and 4 is formed in the same manner as in FIGS. 1 and 2.

Figure 2:
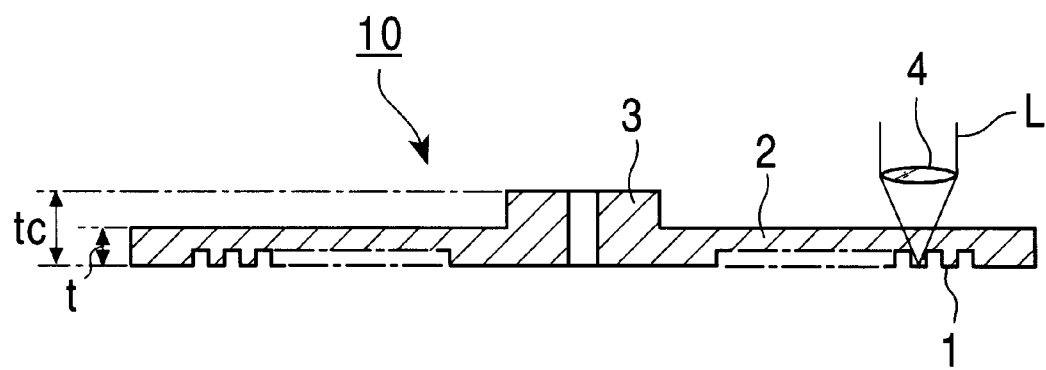
FIG. 2 is a cross-sectional view of an optical recording medium constructed in accordance with a second embodiment of the invention.

Optical recording and/or reproducing at the information-recording face of the optical recording media in FIGS. 3 and 4 is performed in a manner similar to that of FIGS. 1 and 2, by focussing a laser beam L to be transmitted through light-transmitting layers 36 or 46, respectively.

Figure 5:
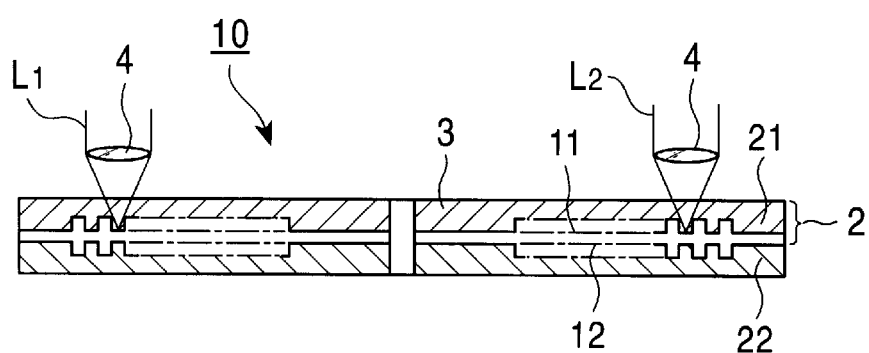
FIG. 5 is a cross-sectional view of an optical recording medium constructed in accordance with a fifth embodiment of the invention.

In accordance with a fifth embodiment of the invention as shown in FIG. 5, a first substrate 51 and a second substrate 61 are coupled via an ultra-violet-curing resin so that the overall thickness tc of the recording medium 50 (including a clamp portion 57) is 1.2 mm. First and second substrates 51 and 52 are preferably formed of the same material, such as a polycarbonate, and having the same thickness in order to prevent deformation of the recording medium. However, second substrate 52 may alternatively be formed of a non-transparent substrate. An information-recording face 53, 54 is respectively formed on each of the opposing faces of first and second substrates 51 and 52. A light-transmitting layer 56 is formed by an upper portion of information-recording face 53 of first substrate 51 and a light transmissive ultra-violet-curing resin positioned between the two substrates 51 and 52 for defining second information-recording face 54.

Optical recording and/or reproducing of information stored at information-recording faces 53 and 54 of the optical recording medium is performed from the side of the recording medium of light-transmitting layer 2 (first substrate 51). In this case, two different laser beams $L_1$ and $L_2$ are used. Focus points of laser beams $L_1$ and $L_2$ are selectively chosen in accordance with respective objective lenses 58 and 59 so that information can be independently recorded at or reproduced from the first and second information-recording faces 53 and 54.

Information-recording faces 53 and 54 are generated similarly to the information recording faces as described in the cases in FIGS. 1 and 2. In this example, however, recording and reproducing at the second information-recording face 54 is carried out by light being transmitted through the first information-recording face 53. For this reason, a reflecting face of first information-recording face 53 is semi-transmissive to the wavelength of laser beam $L_2$, for example, an aluminum type metal reflecting thin film, or semi-transmissive dielectric reflecting film.

The optical recording/reproducing apparatus according to this fifth embodiment of the invention employs an optical recording medium having a light-transmitting layer formed integral with information-recording face. The light-transmitting layer is preferably formed with a thickness $t_5$=0.6 mm with a variation range $\Delta t$ of $\pm 5.98$ $\lambda/(NA)^4$. The apparatus performs at least one of reproducing and recording with laser beams having the wavelength of $\lambda$ of 390 nm$\leq\lambda\leq$440 nm which is provided from the side of the light-transmitting layer via a lens system having an NA (numerical aperture) of $0.6\leq NA\leq 0.72$.

Figure 6:
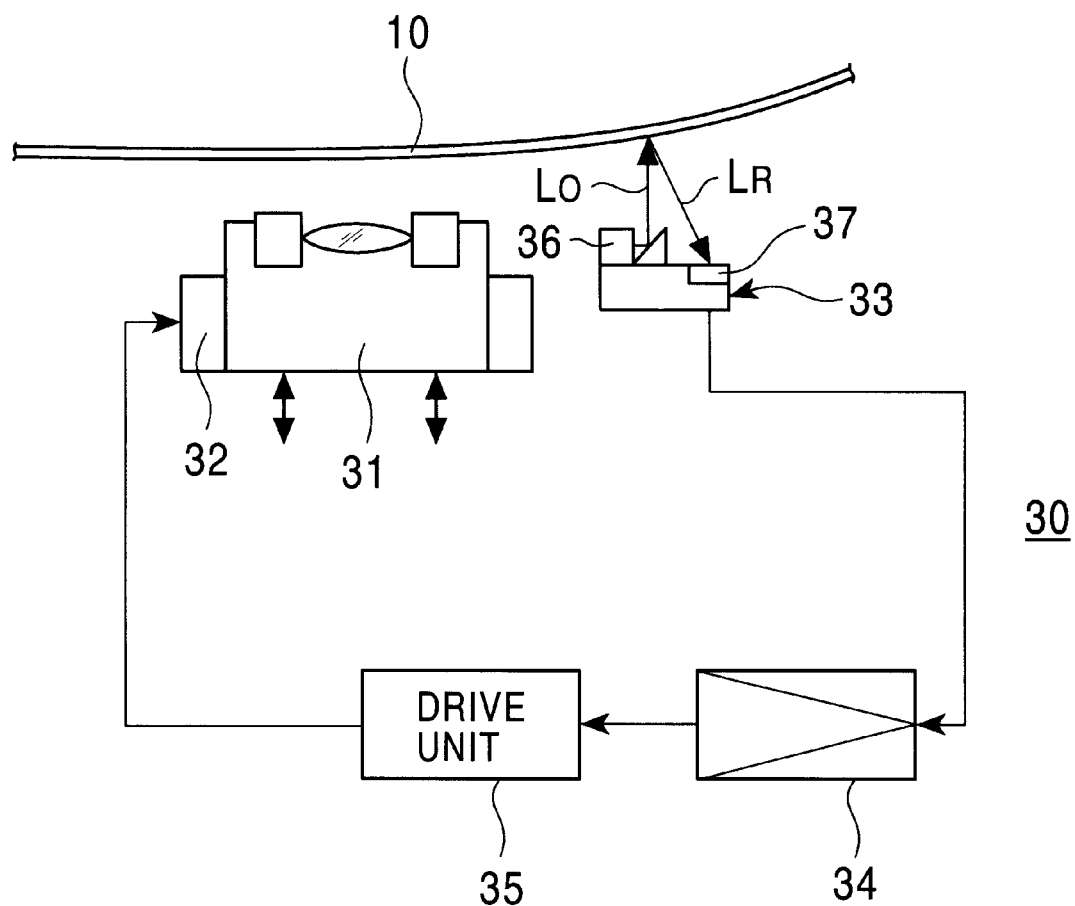
FIG. 6 depicts a skew-compensating unit constructed in accordance with the invention.

As is next shown in FIG. 6, an optical recording/reproducing apparatus 60 for recording and/or reproducing data from an optical recording medium constructed in accordance with the invention includes an optical pickup unit 61. Optical unit 61 has a compensator that performs mechanical and electrical compensation for normalizing signal characteristics according to skew of the optical recording medium. Optical unit 61 is rotated by means of a drive mechanism 62, such as an electromagnetic means or an electric motor drive, to adjust for skew of the recording medium as necessary. The optical recording/reproducing apparatus also has a skew detector 63 for detecting the skew of an optical recording medium, an amplifier 64 for amplifying a detected skew signal, and a drive unit 65 for driving and controlling drive mechanism 62 by using the output of amplifier 64.

The skew of an optical recording medium is generally caused by a U-shaped or other deformation of the recording medium, and skew detector 63 is configured so as to detect the slant angle at individual portions of the recording medium. In particular, skew detector 63 is preferably comprised of a semiconductor laser 66, that operates on a wavelength that does not affect recording and reproducing of information from the optical recording medium. Laser 66 emits a power-detecting optical beam $L_0$, and also includes a detecting element, such as a photodiode 67, that detects the power of a reflected optical beam $L_R$ of the detecting optical beam $L_0$ from optical recording medium 100. The detecting optical beam $L_0$ is focused at a position on optical recording medium 100 in the vicinity of where reading and writing laser beams emitted from the optical unit 61 are formed on the optical recording medium.

Reflected optical beam $L_R$ of power-detecting optical beam $L_0$ reflected from optical recording medium 100 is received incident on photodiode 67 at slightly different angles and positions depending upon the slant angle of the reflection of detecting optical beam $L_0$, which is dependent upon the skew of the optical recording medium. Photodiode 67 is formed of segmented photodiodes so that variation in the amount of light in the individual segmented photodiodes can be determined. This allows detection of the position where the optical beam $L_R$ reflected from optical recording medium 100 is incident. This detection is indicative of the slant angle of the recording medium in the vicinity of the position where the reading and writing laser beams are emitted from optical unit 61.

A detecting signal generated from photodiode 67 is amplified by amplifier 64. The output from amplifier 64 is input to drive unit 65 which in turn controls drive mechanism 62. The slant angle of optical unit 61 is thus adjusted to match the skew angle of the optical recording medium. In this way, proper reading and writing can be performed by optical unit 61, even if there is a deformation in the emitted-spot shape of the reading and writing laser beams due to a skew or deformation of the recording medium.

Figure 7:
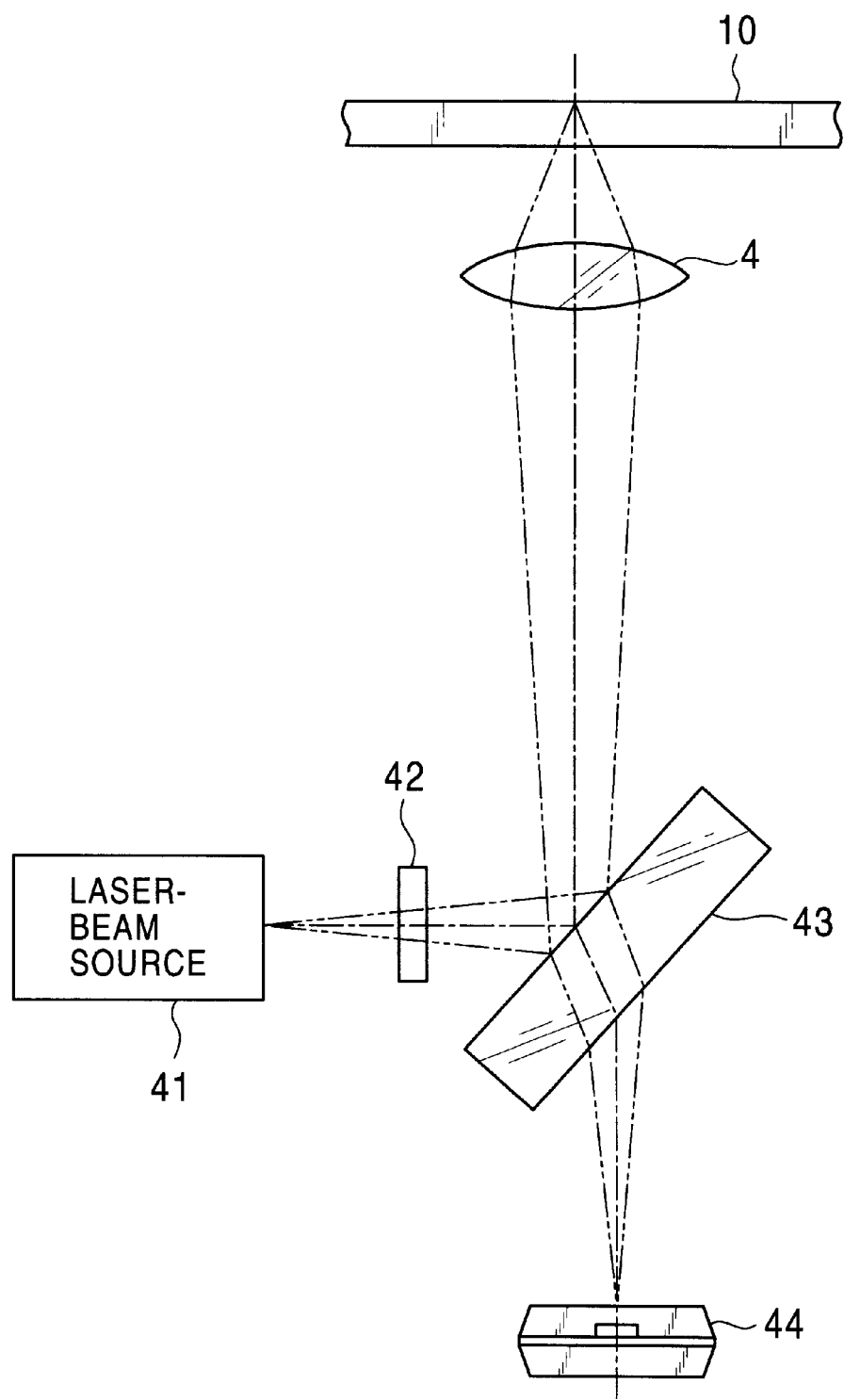
FIG. 7 depicts an optical-pickup constructed in accordance with the invention.

The configuration of optical unit 61 is shown in FIG. 7. This configuration includes a laser-beam source 71 such as a semiconductor laser or a laser and a wavelength modulating element; a diffraction grating 72; a beam splitter 73; an objective lens 74; and a detecting element 75 such as a photodiode. Detecting element 75 allows for the reading of information by detecting a reflected optical beam that has its optical intensity modulated according to information recorded on optical recording medium 100.

As described above laser beams L, $L_1$, or $L_2$, as shown in FIGS. 1 to 5, may have a wavelength $\lambda$ of 860 nm, and the actual used wavelength $\lambda$ of about 430 nm is generated by modulating the wavelength of the laser beam by means of a wavelength-modulating element, such as an SHG (second harmonic generation) element. Alternatively, a semiconductor laser having a wavelength of about 400 nm may be used to generate the laser beams. In addition, the laser beam wavelength can vary by $\pm 10$ nm. According to these factors, the wavelength of laser beams to be used in the present invention is preferably 390 nm$\leq\lambda\leq$440 nm.

An allowable thickness variation TM and an allowable skew SM are represented by the following expressions:

$$TM \; \lambda/(NA)^4$$

$$SM \; \lambda/(NA)^3/t$$

Therefore, when the DVD format with the wavelength $\lambda$=0.65 $\mu$m, TM=$\pm 30$ $\mu$m, and SM=$\pm 0.4°$ is used as a reference, and when the thickness t of the light-transmitting layer of the optical recording medium invention is assumed to be 0.6 mm so that the apparatus of the invention for reading from and writing to the optical recording medium also conforms to a standard DVD format, the allowable thickness variation TM and the allowable skew SM are represented by the following expressions:

$$TM=\pm 30\times(0.6/NA)^4\times(\lambda/0.65)$$

$$=\pm 5.98 \; \lambda/(NA)^4$$

$$SM=\pm 0.4\times(0.6/NA)^3\times(\lambda/0.65)$$

$$=\pm 0.133 \; \lambda/(NA)^3$$

Specifically, for the configuration of the present invention, when the thickness of the light-transmitting layer is 0.6 mm, the thickness variation $\Delta t$ is determined to be within a range of $\pm 5.98 \; \lambda/(NA)^4$ of the allowable thickness TM. Also, in the case of a laser beam having a wavelength of 0.39 $\mu$m$\leq\lambda\leq$0.44 $\mu$m, the numerical aperture (NA) can be equal to or larger than 0.6 which is the same as DVD and preferably equal to or smaller than 0.72, that is, $0.6\leq NA\leq 0.72$.

Hereinbelow, a description will be given of a ROM Disc (or DVD) configuration in which the information-recording face of the present invention is 120 mm in diameter and is formed of a single layer based on a DVD-equivalent signal-recording region as a reference.

The recording capacity of a standard DVD is 4.7 GB, and a track pitch of the DVD is TP=0.74 $\mu$m, a linear density of the recorded information is LD=0.27 $\mu$m/bit, and a smallest pit length $P_{min}$=0.4 $\mu$m. Additionally, a standard DVD uses a recording and reproducing laser with a wavelength of $\lambda$=0.65 and has an allowable skew of SM=$\pm 0.4°$. The smallest recording capacity of the apparatus constructed in accordance with the invention recording on a DVD compatible recording medium employing a laser beam of $\lambda=0.44$ and NA=0.6 is:

$$4.7 \times (0.65/0.44)^2 [GB]$$

$$=10.3 \text{ GB}$$

The individual related factors are as follows:

$$TM=\pm 5.98 \; \lambda/(NA)^4 [\mu m]$$

$$=\pm 20 \; \mu m$$

$$SM=\pm 0.133 \; \lambda/(NA)^3 [\text{degrees}]$$

$$=\pm 0.27°$$

$$TP=0.74 \times 0.44/0.65 [\mu m]$$

$$=0.5 \; \mu m$$

$$LD=0.27 \times 0.44/0.65 [\mu m/\text{bit}]$$

$$=0.18 \; \mu m/\text{bit}$$

$$P_{min}=0.4 \times 0.44/0.65 [\mu m]$$

$$=0.27 \; \mu m$$

The largest recording capacity of the apparatus in accordance with the present invention for this same recording medium employing a laser having a wavelength of $\lambda=0.39$ $\mu m$ and NA=0.72 is:

$$4.7 \times (0.65/0.39 \times 0.72/0.6)^2 [GB]$$

$$=18.8 \text{ GB}$$

The individual related factors are as follows:

$$TM=\pm 5.98 \; \lambda/(NA)^4 [\mu m]$$

$$=\pm 9 \; \mu m$$

$$SM=\pm 0.133 \; \lambda/(NA)^3 [\text{degrees}]$$

$$=\pm 0.14°$$

$$TP=0.74 \times 0.39/0.65 \times 0.6/0.72 [\mu m]$$

$$=0.37 \; \mu m$$

$$LD=0.27 \times 0.39/0.65 \times 0.6/0.72 [\mu m/\text{bit}]$$

$$=0.13 \; \mu m/\text{bit}$$

$$P_{min}=0.4 \times 0.39/0.65 \times 0.6/0.72 [\mu m]$$

$$=0.20 \; \mu m$$

In accordance with the invention, the optical recording medium includes at least an area containing pit-string data formatted with a track pitch ranging from 0.37 to 0.5 $\mu m$, a smallest bit length ranging from 0.20 to 0.27 $\mu m$, and a recording linear density ranging from 0.13 to 0.18 $\mu m/\text{bit}$. These factors represent data formatted and compacted to meet a standard DVD format. When a technique of reducing the bit width according to Japanese Unexamined Patent Publication No. 1-312748 is used, while the data is no longer compatible with a standard DVD, the bit length is reduced by about 30%. Accordingly, the width is reduced to 70% of the above $P_{min}$, resulting in $P_{min}=0.37 \times 0.7=0.26 \; \mu m$. Also, the capacity is increased up to $18.8/0.7=26.8$ GB.

The present invention may also be applied to a standard DVD+R/W disc (a SONY brand), which has a single-spiral-groove recording structure with a track pitch TP=0.80 $\mu m$, a linear density LD=0.35 $\mu m/\text{bit}$ and a standard recording capacity of 3.0 GB.

When the invention is applied to such a recording medium, and the recording capacity is made to be the smallest, (using $\lambda=0.44 \; \mu m$ and NA is=0.6) the recording capacity is:

$$3.0 \times (0.65/0.44)^2 [GB]$$

$$=6.5 \text{ GB}$$

The other individual factors are as follows:

$$TP=0.8 \times 0.44/0.65 [\mu m]$$

$$=0.54 \; \mu m$$

$$LD=0.35 \times 0.44/0.65 [\mu m/\text{bit}]$$

$$=0.24 \; \mu m/\text{bit}$$

When the largest recording capacity is desired, and, ($\lambda=0.39 \; \mu m$ and NA=0.72), the recording capacity is:

$$3.60 \times (0.65/0.39 \times 0.72/0.6)^2 [GB]$$

$$=12 \text{ GB}$$

The other factors are as follows:

$$TP=0.8 \times 0.39/0.65 \times 0.6/0.72 [\mu m]$$

$$=0.4 \; \mu m$$

$$LD=0.35 \times 0.39/0.65 \times 0.6/0.72 [\mu m/\text{bit}]$$

$$=0.18 \; \mu m/\text{bit}$$

In accordance with the invention of this embodiment, the optical recording medium is arranged having a single-spiral recordable region with a track pitch ranging from 0.4 to 0.54 $\mu m$, and a recording linear density ranging from 0.18 to 0.24 $\mu m/\text{bit}$.

The invention may further be applied to a standard DVD-RAM disc, which has an L/G (land-and-groove) structure, having a track pitch TP=0.74 $\mu m$, a linear density LD=0.41 $\mu m/\text{bit}$, and a recording capacity of 2.6 GB.

When the invention is applied to such a recording medium, and the recording capacity is made to be the smallest (using $\lambda=0.44 \; \mu m$ and NA=0.6), the recording capacity is:

$$2.6 \times (0.65/0.44)^2 [GB]$$

$$=5.7 \text{ GB}$$

The TP is:

$$TP=0.74 \times 0.44/0.65 [\mu m]$$

$$=0.5 \; \mu m$$

The LD is:

$$LD=0.41 \times 0.44/0.65 [\mu m/\text{bit}]$$

$$=0.28 \; \mu m/\text{bit}$$

When the largest recording capacity is desired, ($\lambda=0.39 \; \mu m$ and NA=0.72), the recording capacity is:

$$2.6 \times (0.65/0.39 \times 0.72/0.6)^2 [GB]$$

$$=10.4 \text{ GB}$$

The TP is:

TP=0.74×0.39/0.65×0.6/0.72[μm]

=0.37 μm

The LD is:

LD=0.41×0.39/0.65×0.6/0.72[μm/bit]

=0.21 μm/bit

In accordance with the invention of this embodiment, the optical recording medium is arranged having a recordable region having a land-and-groove structure with a track pitch ranging from 0.37 to 0.50 μm, and a recording linear density ranging from 0.21 to 0.28 μm/bit.

A recording system that uses a red-laser format to record information on a magneto-optical recording medium is described in "Nikkei Electronics" (Table 1 on page 13), Vol. No. 688, May 5, 1997. This format uses a land and groove (L/G) recording structure, and is characterized in that TP=0.6 μm, LD=0.2 μm/bit, and the capacity is 7 GB. When a short wavelength laser and a high NA lens according to the invention is applied to this apparatus and recording medium an ASMO (advanced storage magneto optical) format is generated. When smallest recording capacity is desired (λ=0.44 μm, NA=0.6), this capacity is:

5×(0.65/0.44)²[GB]

=10 GB

The individual factors are as follows:

TP=0.64×0.44/0.65[μm]

=0.43 μm

LD=0.23×0.44/0.65[μm/bit]

=0.16 μm/bit

When the largest recording capacity is desired (λ=0.39 μm and NA=0.72), that capacity is:

7×(0.65/0.39×0.72/0.6)²[GB]

=28 GB.

and the associated individual factors are as follows:

TP=0.6×0.39/0.65×0.6/0.72[μm]

=0.30 μm

LD=0.2×0.39/0.65×0.6/0.72[μm/bit]

=0.10 μm/bit

According to a standard phase-transition recording method, when recording in an MMVF format, the track pitch is TP=0.56 μm, the density is LD=0.285 μm/bit, and the storage capacity is 5.2 GB. The phase-transition method records using a land and groove (L/G) recording structure. When the method and apparatus of the invention is applied to the phase-transition recording method, and the smallest recording capacity is desired (λ=0.44 μm and NA=0.6), that capacity is:

5.2×(0.65/0.44)²[GB]

=11.3 GB

The individual factors are as follows:

TP=0.56×0.44/0.65[μm]

=0.38 μm

LD=0.285×0.44/0.65[μm/bit]

=0.19 μm/bit

When the largest recording capacity is desired (λ=0.39 μm and NA=0.72), that capacity is:

5.2×(0.65/0.39×0.72/0.6)²[GB]

=21 GB and the individual factors are as follows:

TP=0.56×0.39/0.65×0.6/0.72[μm]

=0.28 μm

LD=0.285×0.39/0.65×0.6/0.72[μm/bit]

=0.10 μm/bit

Figure 8A:
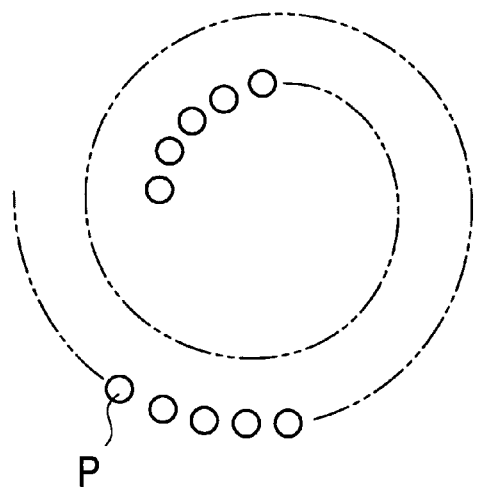
FIGS. 8A and 8B depict recording patterns for recording information on an optical recording medium according to the invention.
Figure 8B:
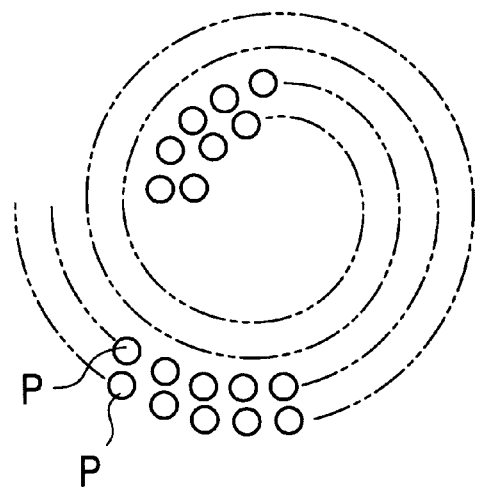
Figure 9:
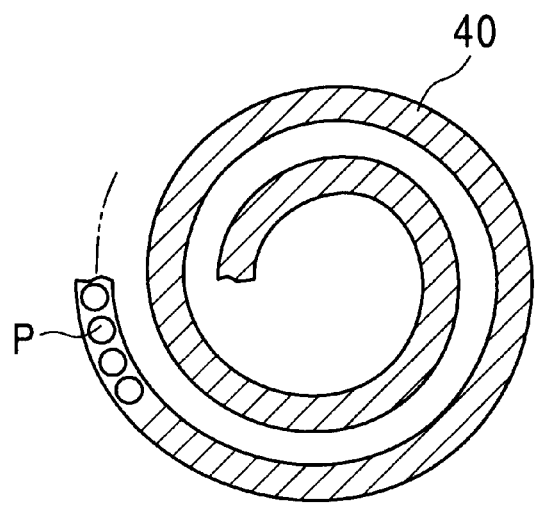
FIG. 9 depicts a recording pattern for recording information on an optical recording medium according to the invention.

FIGS. 8 to 10 show example patterns of information-recording faces of the optical recording medium according to the present invention. FIGS. 8A and 8B show an arrangement pattern including pit-string data. Pits P can be formed either on a single spiral line as shown in FIG. 8A or on a plurality of spiral lines (preferably double spiral lines), as in an example in FIG. 8B.

FIG. 9 shows an example in which a recordable region 40 (hatched portion in the figure) is formed in an area other than a region where pits P are formed. The recordable region 40 can also be formed in either a single spiral or a plurality of spirals, similarly to the case of the pit-string data described above.

In forming a plurality of spirals, such as double intertwined spirals, a single spiral groove may form, and two recordable regions are formed, one within the groove and one in the inter-groove region (or land). Alternatively, pits P forming a ROM may be formed on the land.

Figure 10A:
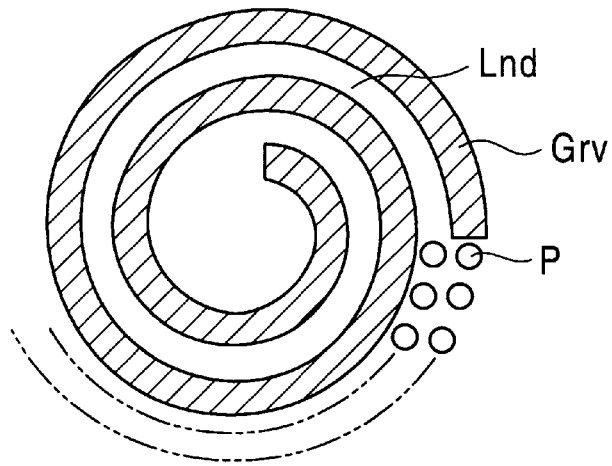
FIGS. 10A–10C depict recording patterns for recording information on an optical recording medium according to the invention.
Figure 10B:
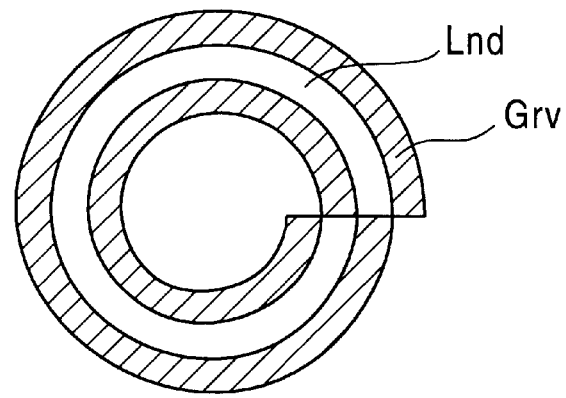
Figure 10C:
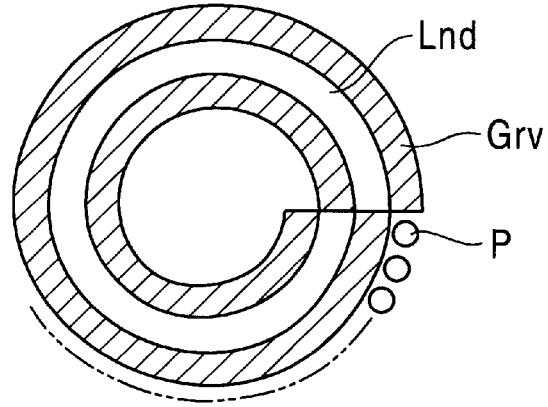

Also, as schematically shown in FIGS. 10A–10C, a spiral groove Grv (hatched portion in the figure) is formed. As noted in FIG. 10A pit-string data P may be recorded in extensions of the groove Grv and a land Lnd. Also, as shown in FIGS. 10B and 10C, a groove Grv and a land Lnd may be continuously formed, and pit-string P may be formed on an extension thereof. In this way, various modifications may be arranged.

As described above, according to the individual formats of the optical recording medium of the present invention, while compatibility with conventional DVDs and recording/reproducing apparatuses compatible with the DVDs is maintained, an improved, higher recording density can be implemented, and thus an increased recording capacity can be achieved.

Furthermore, according to the recording/reproducing apparatus of the present invention, the slant angle of the optical unit that performs at least one of recording and reproducing is adjusted according to the skew of the optical recording medium. Thereby, the skew of the optical recording medium can be substantially compensated for, and high quality recording and reproducing can be performed.

It will thus be seen that the objects set forth above, among those made apparent from the preceding description, are efficiently attained and, because certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An optical recording medium, comprising:
   a light-transmitting layer having a thickness of approximately 0.6 mm, which allows at least one of recording and reproducing to be performed with a laser beam having a wavelength of 390 mn$\leq\lambda\leq$440 nm which is incident to said optical recording medium through the light-transmitting layer; and wherein the variation in the thickness of the light-transmitting layer is within a range of $\pm 5.98\ \lambda/(NA)^4$.

2. The optical recording medium of claim 1, wherein said laser beam is focused by a lens system having a numerical aperture (NA) of 0.6$\leq$NA$\leq$0.72.

3. The optical recording medium of claim 2, further comprising a clamp section having a thickness of at least 1.2 mm, thereby conforming to the format of a standard DVD.

4. The optical recording medium of claim 2, wherein a skew of the optical recording is within a range of $\pm 0.133\ \lambda/(NA)^3$(degrees), where the wavelength $\lambda$ is measured in micrometers.

5. The optical recording medium of claim 2, having at least a part of an information area in which pit-string data has a track pitch ranging from 0.37 to 0.50 $\mu$m, a smallest pit length is at most 0.27 $\mu$m, and a recording density is at most 0.18 $\mu$m/bit.

6. The optical recording medium of claim 2, having at least a part of an information area in which pit-string data has a track pitch ranging from 0.37 to 0.50 $\mu$m, a smallest pit length ranges from 0.20 to 0.27 $\mu$m, and a recording density ranges from 0.13 to 0.18 $\mu$m/bit.

7. The optical recording medium of claim 2, including in an information recording area a recordable area in which a track pitch is at most 0.54 $\mu$m and a recording density is at most 0.24 $\mu$m/bit.

8. The optical recording medium of claim 2, including, in an information recording area a record area in which a track pitch ranges from 0.4 to at most 0.54 $\mu$m and a recording density ranges from 0.18 to 0.24 $\mu$m/bit.

9. The optical recording medium of claim 2, including in an information recording area having a land-and-groove structure a record area in which a track pitch is at most 0.50 $\mu$m and a recording density is at most 0.28 $\mu$m/bit.

10. The optical recording medium of claim 2, including in an information recording area having a land-and-groove structure a record area in which a track pitch ranges from 0.37 to 0.50 $\mu$m and a recording density ranges from 0.21 to 0.28 $\mu$m/bit.

11. An optical recording/reproducing apparatus employing an optical recording medium having a light-transmitting layer with a thickness of approximately 0.6 mm and variation in the thickness within a range of $\pm 5.98\ \lambda/(NA)^4$, said apparatus comprising:
    an optical unit for performing at least one of recording on and reproducing from said optical recording medium, said optical unit emitting a laser beam having a wavelength of 390 nm$\leq\lambda\leq$440 nm which is incident to said optical recording medium through the light-transmitting layer.

12. The optical recording/reproducing apparatus of claim 11, further comprising a lens system having a numerical aperture (NA) of 0.6$\leq$NA$\leq$0.72.

13. The optical recording/reproducing apparatus of claim 11, further comprising compensating means for compensating signal characteristics of reproduced data according to a detected skew of the optical recording medium.

* * * * *